3,448,078
HALOGENATED PHENOL-FORMALDEHYDE RESIN
Harold P. Higginbottom, Wilbraham, Mass., assignor to Monsanto Company, St. Louis, Mo., a corporation of Delaware
No Drawing. Filed July 17, 1967, Ser. No. 653,643
Int. Cl. C08g *37/08, 51/56, 51/58*
U.S. Cl. 260—53                                     12 Claims

ABSTRACT OF THE DISCLOSURE

Light-colored phenol-aldehyde resins and process for making same by polymerizing in the presence of an inorganic phosphorous-radical-containing compound.

BACKGROUND

Those skilled in the art will appreciate that phenol-aldehyde resins which have been halogenated display a greater reactivity or ability to crosslink in those reactions requiring a more acidic phenolic hydroxyl group. However, the halogenated phenol-aldehyde polymers heretofore known to the art (especially those made using formaldehyde) have characteristically been very dark colored, either in solution or in a form of powders. For many applications, dark phenolic resins are not desirable because they tend to produce molded and other products, which are dark colored. There is thus a long felt need in the art for a light colored reactive phenol-aldehyde polymer of the halogenated type.

In making halogenated phenol-aldehyde polymers, the art has usually employed aqueous formaldehyde media for reacting the halogenated phenol. However, aqueous media tend to inhibit the rate of condensation of halogenated phenol with aldehyde so that long reaction times and low yields characteristically result from aqueous media. The low yields characteristically result from a loss of aldehyde from the aqueous phase. Pressure equipment and high temperatures are necessary to overcome this problem in the prior art. To circumvent these difficulties, non-aqueous reaction media are desirable, but merely changing from aqueous to organic phase does not appreciably improve the dark undesirable color properties of the resulting halogenated phenol-aldehyde polymer. A further complicating circumstance in organic reaction media is that, while the initial reaction rate is increased between phenol and aldehyde, the condensation reaction tends to split out water which acts as an inhibiting influence on the condensation. Therefore, as a result as the condensation proceeds in a batch process, the rate declines.

It has now been discovered that one can produce improved halogenated phenol-aldehyde polymers which have a superior light color and which have superior shelf-life color stability. This discovery also embraces a process for making such light-colored polymers.

SUMMARY

This invention relates to color stable halogenated phenol-aldehyde polymers (especially those made with formaldehyde) produced by reacting, in an inert, non-polar organic liquid, an aldehyde with at least one halophenol compound selected from the group consisting of ortho halophenols and para halophenols in the presence of from about 0.1 to 7 weight percent (based on total halophenol content) of a combination comprising:

(a) From about 10 to 90 weight percent (based on total dry combination weight) of at least one material selected from the group consisting of $BF_3$ materials and organo sulfonic acid materials, and (b) Correspondingly, from about 90 to 10 weight percent (based on total dry combination weight) of at least one inorganic phosphorous radical-containing compound.

Inorganic phosphorous radical-containing compounds include phosphorous acid and salts thereof, and hypophosphorous acid, and salts thereof.

$BF_3$ materials include $BF_3$ organo complexes, $BF_3$ inorganic acid complexes, $BF_3$ water complexes and $BF_3$. Such $BF_3$ materials and methods for their preparation are well known to those of ordinary skill in the art.

Organo sulfonic acid materials include aryl sulfonates, alkyl sulfonates, and aralkyl sulfonates. Such organo sulfonic acid materials and methods for their preparation are well known to those of ordinary skill in the art.

Mixtures of various $BF_3$ materials, and/or various organo sulfonic acid materials and/or various phosphorous radical-containing compounds can be employed in practicing this invention.

Using the combination just described, when reacting such a halophenolic material with an aldehyde in an organic liquid medium as indicated above, there is produced a product which has very light color and superior color stability, as demonstratable, for example, by the ASTM Test Evaluation Procedure No. D1544–63T using 10 percent solutions of polymer in acetone.

In addition, the polymeric products of this invention undergo a color-forming reaction of the so-called adsorption type when the polymeric product of this invention is placed in contact with an organic material (as contained, for example, in a printing fluid) without the presence of an ionizing medium being required, although other color-forming reactions may be used instead. Of the preferred reactant materials employed, the organic material is an electron donar aromatic compound having a double bond system which is convertible to a more highly polarized conjugated form upon taking part in an electron acceptor-donar solid surface chemical reaction, thereby giving to such organic material a distinctive color. This chemical reaction causes the polymeric product of this invention to be an acid relative to the organic material so as to be an electron acceptor when in adsorption contact therewith. Utilizing this color-forming reaction, involves incorporating the polymeric product of this invention into a record material in fine particle form so as to furnish a large adsorption reaction surface thereon or therein. Printing fluids containing such an organic material, when applied to such record material thus makes a mark thereon by its own intrinsic color. Such organic material is characteristically one which, without visually perceptible delay, assumes a distinctive color only when applied to the so-sensitized record material by reason of a color-forming reaction occurring there. Thus, on a typical sensitized record material, a printing fluid produces two colors which are so chosen as to blend to make a resultant color distinctive from that made on unsensitized record material. Suitable printing fluids are disclosed, for example, in the U.S. Patent No. 2,850,395 to Green, and elsewhere.

The products of this invention are also useful in the manufacture of adhesives. Thus, the products of this invention readily react with glycidyl ethers to produce an epoxidized halogenated phenolic resin. These epoxidized resins are useful in formulating structural adhesives having excellent adhesive bond strengths. One method which may be used for the preparation of such epoxidized products is described in U.S. Patent No. 2,716,099 to Bradley, Newey and Newey.

The polymeric products of this invention are further useful as starting materials for the alkylation procedures given and described in copending application, Ser. No. 653,644, filed on even date herewith.

As indicated above, the condensation reaction between halophenol and aldehyde is conducted in an inert non-polar organic liquid. By the term "inert", reference is had to the fact that the liquid is substantially non-reactive towards reactants and products derived therefrom.

By the term "non-polar," reference is had to the fact that the liquid has a low dielectric constant. Preferred liquids have dielectric constants which are below about 20. More preferred liquids have dielectric constants falling in the range of from about 2 to 4.

By the term "organic" reference is had to liquids which contain carbon as their main component, the preferred organic liquids are hydrocarbons. In addition, fluoro carbons and various heterocyclic non-polar inert organic liquids can be used within the spirit and scope of this invention.

Preferred inert, non-polar, organic liquids suitable for use in the present invention are those which form, with water, mixtures which are azeotropic, the reason being that with such liquids it is possible to remove the water produced during the condensation reaction occurring in the process of this invention by continuous distillation so that the total water content of any given reaction mixture is maintainable at very low, preferably substantially zero levels, during such condensation reaction. In general, it is desirable to maintain the total water level present in the reaction medium below about 5 weight percent based on the total system weight. Although higher water levels can be tolerated within the spirit and scope of this invention, it is desirable and preferred to avoid same, since such higher water levels tend to reduce product yields and slow down the condensation reaction. Furthermore, such higher water levels may, in some instances, actually detract from the superior color and color stability properties associated with products of this invention.

When employing azeotropic mixtures in the practice of the present invention, it is much preferred to employ organic liquids which, in addition to forming azeotropic mixtures with water, are substantially completely immiscible therewith. In general, it is preferred to employ such liquids which are immiscible with water to the extent that they are not more than about 5 weight percent soluble (miscible) with water, that is, with equal volumes of water and inert non-polar organic liquid, neither dissolves in the other to an extent greater than about 5 weight percent (based on total weight of liquid). The reason such immiscible mixtures are used is that they permit easy separation of water therefrom following an azeotropic distillation. Because of ease of separation, it is naturally preferred to employ those inert non-polar organic liquids which will form clean phase separations with water, e.g., the interface between organic liquid and water is so clearly defined in a given situation that water is readily separable from a mixture of two such liquids. It will be appreciated that such phase separation is important after an azeotropic distillation for the purpose of recycling and re-using the organic liquid thereby minimizing the costs associated with the practice of the invention in any given instance.

Preferred inert, non-polar, organic liquids for use in the present invention have boiling points generally in the range of from about 70–140° C. since such liquids are particularly useful in azeotropic distillation as used in this invention. Furthermore, such liquids permit ready separation of the organic liquid from a reaction mixture at the end of a condensation reaction, as by distillation.

In general, one merely uses sufficient organic liquid in practicing the process of this invention to maintain the co-condensation reactants (phenolic compound and aldehyde compound) in sufficient dissolved concentration, respectively, to allow the condensation to proceed at a convenient rate. Before and/or during a condensation, it is preferred, but not critical, to have the phenolic and the aldehyde co-reactants which are not then dissolved in the organic liquid dispersed therein in the form of finely divided particles or flakes. It is also preferred to employ about 10 to 50 weight percent of solvent based on total weight of phenolic (co-condensable) reactants, but higher and lower concentrations are convenient to use.

Examples of suitable organic liquids include:

(a) Benzene and substituted benzenes such as toluene, ortho- meta- and para-xylene, trimethylbenzenes, mono-, di- and triethyl benzenes, nitrobenzene, chlorobenzene, biphenyl, chlorinated biphenyls and the like;

(b) Aliphatic ethers of general formula $C_nH_{2n+2}O$, such as di-n-butyl ether, amyl ether, etc., and mono and di ethers based on methylene, ethylene and propylene glycol of general formula $C_nH_{2n+2}O_2$, such as ethylene glycol dimethyl ether, ethylene glycol diethyl ether, etc., and ethers based on polyethylene glycols such as diethylene glycol diethyl ether, etc.;

(c) Aromatic and cyclic ethers such as anisole, phenetole, phenylpropyl ether, diphenylether, dioxane, furan, etc.;

(d) Non-reactive alcohols of the general formula $C_nH_{2n+2}O$ such as n-butanol, octanol, etc.;

(e) Aliphatic and alicyclic hydrocarbons such as hexane, heptane, nonane, cyclohexane, methyl cyclohexane, fluorocarbons, and the like.

As indicated above, the halogenated phenol used is either an ortho halophenol or a para halophenol. Examples of ortho halophenols include: ortho chlorophenol, ortho bromophenol and ortho fluorophenol. Examples of para halophenols include: para fluorophenol, para chlorophenol, and para bromophenols. In general, it is desirable not to use iodo phenols because of the tendency of such phenols to break down in a condensation reaction between phenols and an aldehyde and because of economic reasons well known to those of ordinary skill in the art.

In producing the halogenated phenol-aldehyde products of this invention, any suitable aldehyde or mixtures of aldehydes capable of reacting with a halophenol is satisfactory. Preferred aldehydes are those which do not contain a functional group or structure which is detrimental to the condensation reaction or the final product. In general, mono-aldehedic compounds containing less than 8 carbon atoms each are suitable. The most preferred aldehyde is formaldehyde, including any of its low polymeric forms such as paraform or trioxane. Other examples of aldehydes include acetaldehyde, propionaldehyde, butyraldehyde, benzaldehyde, furfural, 2 - ethylhexanal, ethylbutyraldehyde, heptaldehyde, glyoxal, etc.

The amount of aldehyde to be condensed with the halophenols may be varied to prepare products of varying molecular weights and the melting point of the finished resin may be controlled by the mol weight of a product. Preferably, in products of this invention, the amount of combined aldehyde varies from about 0.5 to 1.0 mol per mol of condensable phenol compound. This mol ratio controls, then, mol ratios of starting materials.

In practicing the process portion of this invention, it is convenient to use in any given instance an excess of aldehyde (molar basis) compared to phenolic co-reactant, particularly when using volatile aldehydes like formaldehyde, in order to compensate for possible loss of some of the aldehyde during the processing. Typically, in practicing this invention, aldehyde losses are predictable and reproducible as from batch to batch of similar reactants and reaction conditions.

In practicing this invention, one can use, as starting materials a mixture of phenolic compounds in which at least about 50 mol plus percent of the total phenolic compounds present are halophenols as described above. The remainder up to 100 mol percent of the total phenolic compounds present are non-polar, phenols which may be substituted with aliphatic groups, cycloaliphatic groups, or aromatic groups, which are at least as reactive with the aldehyde co-reactant(s) as are the halophenol co-reactants.

A class of non-halogen containing phenols suitable for use in this invention is characterized by the following general formula:

(I)

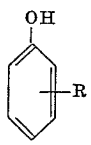

where R may be H or a suitable substituent selected from the following:

(a) Alkyl groups of 1 to 18 carbon atoms in any of their isomeric forms and substituted on the phenolic nucleus in the ortho, meta or para positions;

(b) Alicyclic groups of 5 to 18 carbon atoms, such as cyclohexyl, cyclopentyl, methyl cyclohexyl, butyl-cyclohexyl, etc.;

(c) Aromatic or aralkyl groups of 6 to 18 carbon atoms, such as phenyl, alpha-methyl benzyl, benzyl, cumyl, etc.;

Suitable substituted phenols of Formula I include the following: para - tertiary - butylphenol, para - secondary-butylphenol, para-tertiary hexylphenol, para-isoctyl-phenol, para-phenylphenol, para-benzylphenol, para-cyclohexylphenol, para - decyl - phenol, para-dodecyl-phenol, para-tetra-decyl-phenol, para - octa - decyl - phenol, para-nonyl-phenol, para - methyl - phenol, para-beta-naphthyl-phenol, para-alpha-naphthyl-phenol, para-pentadecyl-phenol, para-cetyl-phenol, para-cumyl-phenol, as well as the corresponding ortho derivatives such as ortho-butyl phenol, as well as mixtures thereof.

The para substituted alkylated phenols of Formula I above are generally preferred for use in this invention. These phenols appear to give mainly linear polymer structures with adjacent phenolic nuclei joined by methylene bridges ortho to the phenolic OH's.

The organo sulfonic acid materials and the $BF_3$ materials apparently serve as catalysts for the condensation reaction, though they are not completely separated from products of this invention. In products, they are homogeneously (uniformly) distributed therethrough.

Examples of boron trifluoride complexes with organic compounds include: complexes of $BF_3$ with organic compounds such as ethanol, butanol, glycol, phenol, cresol, anisole, ethyl ether, isopropyl ether, di-n-butyl ether, formic acid, acetic acid and propionic acid. Examples of boron trifluoride complexes with inorganic acids include such acids as phosphoric acid and sulfuric acid. When $BF_3$ as such is employed, it is concurrently fed to a reaction mixture in gaseous form.

Examples of organosulfonic acid materials include: ethanesulfonic acid, benzene sulfonic acid, benzene disulfonic acid, chlorobenzene sulfonic acid, 3,4-dichlorobenzene sulfonic acid, cresol sulfonic acid, phenol sulfonic acids, toluene sulfonic acids, xylene sulfonic acids, octyl-phenol sulfonic acid, B-naphthalene sulfonic acid 1-naphthol-4-sulfonic acid and the like.

Preferred $BF_3$ materials include: $BF_3$ etherates, $BF_3$ phenol addition compounds, $BF_3$ phosphoric acid complexes, and the like.

Preferred organosulfonic acid materials include: para toluene sulfonic acid monohydrate and commercial mixtures of ortho and para toluene sulfonic acids.

Examples of suitable inorganic phosphorous radical-containing compounds include: phosphorous acid, its mono and dibasic salts with alkali, alkaline earth or transition metals such as sodium, potassium, lithium, calcium, barium and manganese phosphites, and hypophosphorous acid and its salts with alkali, alkaline earth or transition metals such as sodium, potassium, lithium, calcium, barium and manganese hypophosphites.

A most preferred inorganic phosphorous radical-containing compound is phosphorous acid.

One preferred combination comprises from about 40 to 60 weight percent para toluene sulfonic acid and from about 60 to 40 weight percent of phosphorous acid. When using such combination, it is preferred to add to the reaction mixture from about 1 to 2 weight percent of such combination based on total halophenol content.

In adding the organo sulfonic acid material and/or the $BF_3$ material to a reaction mixture, it is preferred to mix such therewith separately from the adding of the inorganic phosphorous radical-containing compound to such mixture.

It will be appreciated that the combination need not be soluble in the organic liquid but rather if not completely soluble therein, can be dispersed throughout such liquid medium in a given reaction in the form of fine particles suspended in the liquid medium. In general, the preferred particle size is below 50 microns. Colloidal suspensions are preferred.

In a preferred embodiment of the present invention, at least one aldehyde is condensed with a mixture of reactable (condensable) phenolic compounds in which at least 50 mol percent thereof comprises at least one halophenol compound selected from the group consisting of ortho halophenols and para halophenols. The balance up to 100 mol percent of said mixture of phenol compounds comprises phenol compounds which are at least as reactive with the co-condensed aldehyde or aldehydes used in a given condensation reaction as are those halophenol compounds used in that same reaction. The product of such a reaction mixture, as those skilled in the art will appreciate, is a partially halogenated (preferably chlorinated) phenol-aldehyde polymer. Such mixed products have the characteristic superior light color, and shelf-life color stability, associated with the products of this invention.

In general, the condensation reaction between halophenol and formaldehyde is conducted under temperature and pressure conditions such that a condensation reaction occurs to produce the desired halophenol aldehyde polymeric product although supra pressures are useable, as those skilled in the art will appreciate, atmospheric pressures and sub-atmospheric pressures are preferred, especially for reasons of convenience.

Suitable process condensation temperatures range from about 50 to 200° C. though temperatures in the range of from about 80 to 140° C. are preferred.

Progress of a condensation reaction can be followed by measuring the water of condensation produced, as those skilled in the art will appreciate.

Typical products of this invention are heat-fusible and have melting points ranging from about 60 to 130° C., and combined aldehyde to phenol mol ratios of from about 0.7 to 0.9. The products of this invention contain from about 0.0002 to 0.04 gram per each gram of phenol aldehyde polymer of at least one material selected from the class consisting of sulfate groups, and boron trifluoride. In addition, products of this invention contain from about 0.0002 to 0.04 gram per each gram of phenol-aldehyde polymer of at least one material selected from the class consisting of phosphite groups and hypophosphite groups.

A preferred but typical phenol-aldehyde product of this invention is characterized by the following general formula:

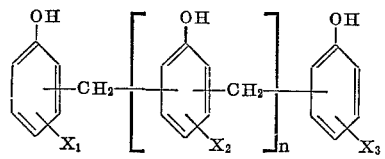

where $n$ is an integer of from 1 to 30 and often higher, and $X_1$, $X_2$, and $X_3$ are each selected from the group consisting of hydrogen, alkyl, phenyl, and lower alkyl phenyl, all such X's being substituted either in the ortho position or in the para position with respect to the hydroxyl group on each phenyl nucleus in the foregoing general structure, and at least 50 mol percent of all such X's in any given product being selected from the group consisting of fluoro, chloro, and bromo.

It will be appreciated that the polymeric product of this invention are not themselves self-curing because they have no self-curing or cross-linking function built into them, as those skilled in the art of novolac resins will readily appreciate.

EMBODIMENTS

The following examples are set forth to illustrate more clearly the principles and practices of this invention to one skilled in the art and they are not intended to be restrictive but merely to be illustrative of the invention herein contained. Unless otherwise stated, all parts and percentages are on a weight basis. Products of this invention described in the following examples conform to general Formula I with the X values being as specified in each case. Each product is a brittle, acetone soluble resin with softening points in the range of 90° to 120° C. and a combined formaldehyde to phenolic ratio of 0.7 to 0.9.

Example 1.—p-Fluorophenol-formaldehyde polymer p-Fluorophenol (100 parts), toluene (30 parts), paraform (91%, 27 parts), and phosphorous acid (70%, 0.7 part) are charged to reaction vessel equipped with a stirrer, reflux condenser and a distillate separator which permits removal of a water phase from an organic solvent phase. The reactants are heated to atmospheric reflux and para-toluene sulfonic acid catalyst (0.5 part in 0.5 part water) is charged. The temperature of the reaction is maintained at atmospheric reflux and condensation water is azeotropically removed continuously during the reaction. The organic phase so distilled is returned to the reaction vessel. When water ceases to be evolved and reaction temperature reaches 120° C., vacuum is gradually applied and the residual solvent removed by distillation. The temperature is gradually increased and vacuum desolvation continued until a temperature of 160° C. at 28 inches Hg vacuum is reached. There remains in the kettle a resinous mass which is a para-fluorophenol-formaldehyde polymer. The product is drained from the reactor and allowed to cool and solidify. Analytically, this resin conforms to general Formula I with substantially all of the X's being fluorine.

Example 2.—p-Chlorophenol-formaldehyde polymer p-Chlorophenol (100 parts), toluene (30 parts), paraform (91%, 24 parts), and phosphorous acid (70%, 0.7 part) are charged to reaction vessel equipped with stirrer, reflux condenser and distillate separator which will permit removal of the water phase from the organic solvent phase. The reactants are heated to atmospheric reflux and para-toluene sulfonic acid catalyst (0.5 part in 0.5 part water) is charged. The temperature of the reaction is maintained at atmospheric reflux, and water is azeotropically removed continuously during the reaction. The distillate water phase is continuously drawn off and the organic phase returned to reaction vessel. When water ceases to be evolved and reaction temperature reaches 120° C., vacuum is gradually applied and the residual solvent removed by distillation. The temperature is gradually increased, and vacuum desolvation continued until a temperature of 160° C. at 28 inches of mercury vacuum is reached. There remains in the kettle a resinous mass which is a para-chlorophenol-formaldehyde polymer. The product is drained from the reactor and allowed to cool and solidify. Analytically, this resin conforms to general Formula I with substantially all the X's being chlorine.

Example 3.—p-Bromophenol-formaldehyde polymer p-Bromophenol (100 parts), toluene (30 parts), paraform (91%, 18 parts), and phosphorous acid (70%, 0.7 part) are charged to reaction vessel equipped with stirrer, reflux condenser and distillate separator which permits removal of a water phase from an organic solvent phase. The reactants are heated to atmospheric reflux and para-toluene sulfonic acid catalysts (0.5 part in 0.5 part water) is charged. The temperature of the reaction is maintained at atmospheric reflux and condensation water is azeotropically removed continuously during the reaction. The organic phase so distilled is returned to the reaction vessel. When water ceases to be evolved and reaction temperature reaches 120° C., vacuum is gradually applied and the residual solvent removed by distillation. The temperature is gradually increased and vacuum desolvation continued until a temperature of 160° C. at 28 inches of mercury vacuum is reached. There remains in the kettle a resinous mass which is a para-bromophenol-formaldehyde polymer. The product is drained from the reactor and allowed to cool and solidify. Analytically, this resin conforms to the general Formula I with substantially all of the X's being bromine.

Example 4.—p-Chlorophenol-p-octylphenol-formaldehyde polymer p-Chlorophenol (100 parts), p-octylphenol (53 parts), toluene (30 parts), paraform (91%, 30 parts) and phosphorous acid (70%, 0.7 part) are charged to reaction vessel equipped with stirrer, reflux condenser and a distillate separator. The reactants are heated to atmospheric reflux, and held for one hour, returning all condensates to reactor. After one hour, para-toluene sulfonic acid catalyst (0.5 part in 0.5 part water) is charged. Water removal from reaction is started by drawing off the distillate water phase and returning organic phase to reactor. Water removal is continued until water evolution ceases and reaction temperature reaches 120° C. Vacuum is then gradually applied and the residual solvent removed by distillation. The temperature is gradually increased and vacuum desolvation continued until a temperature of 160° C. at 28 inches of mercury vacuum is reached. There remains in the kettle a resinous mass which is a para-chlorophenol-p-octylphenol-formaldehyde polymer. The product is drained from the reactor and allowed to cool and solidify. Analytically, this resin conforms to the general Formula I with more than 50 percent of the X's being chlorine and the remainder being the octyl radical.

Example 5.—p-Chlorophenol-p-nonylphenol-formaldehyde polymer p-Chlorophenol (100 parts), p-nonylphenol (57 parts), toluene (30 parts), paraform (91%, 30 parts) and phosphorous acid (70%, 0.7 part) are charged to reaction vessel equipped with stirrer, reflux condenser and a distillate separator. The reactants are heated to atomspheric reflux, and held for one hour returning all condensates to reactor. After one hour, para-toluene sulfonic acid catalyst (0.5 part in 0.5 part water) is charged. Water removal from reaction is started by drawing off the distillate water phase and returning organic phase to reactor. Water removal is continued until water evolution ceases and reaction temperature reaches 120° C. Vacuum is then gradually applied and the residual solvent removed by distillation. The temperature is gradually increased and vacuum desolvation continued until a temperature of 160° C. at 28 inches of mercury vacuum is reached. There remains in the kettle a resinous mass which is a para-chlorophenol-p-nonylphenol-formaldehyde polymer. The product is drained from the reactor and allowed to cool and solidify. Analytically, this resin conforms to general Formula I with more than 50 percent of the X's being chlorine and the remainder being the nonyl radical.

What is claimed is:

1. A color stable halogenated phenol-aldehyde polymer product characterized by being heat-fusible by having melting points ranging from about 60 to 130° C. by having a combined aldehyde to phenol mol ratio of from about 0.5 to 1.0, by containing at least 50 mol percent of combined halogen, by containing from about 0.0002 to 0.04 gram per gram of said polymer of at least one material selected from the class consisting of organo sulfonic acid groups and boron trifluoride, and by containing from about 0.0002 to 0.04 gram per gram of said polymer of at least one material selected from the class consisting of phosphite groups and hypophosphite groups, said product having been produced by reacting in an inert non-polar organic liquid an aldehyde with a phenol selected from the group consisting of orthohalophenol and para-halophenol in the presence of from about 0.1 to 7 weight percent (based on total halophenol), of a combination comprising:

(a) from about 10 to 90 weight percent (based on total combination weight) of at least one material selected from the group consisting of $BF_3$ materials and organo sulfonic acid materials, and, (b) correspondingly, from about 90 to 10 weight percent (based on total combination weight) of at least one inorganic phosphorous radical-containing compound.

2. A color stable halogenated phenol-aldehyde polymer composition comprising:

(a) a polymer having the formula:

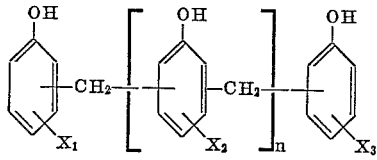

wherein $n$ is an integer of from 1 to 30 and $X_1$, $X_2$, and $X_3$ are each selected from the group consisting of hydrogen, alkyl radicals, phenyl radicals, and lower alkyl phenyl radicals, all such X's being substituted either in the ortho position or in the para position with respect to the hydroxyl group on each phenyl nucleus in such general formula, and at least 50 mol percent of all such X's in any given product being selected from the group consisting of fluoro, chloro, and bromo, (b) from about 0.0002 to 0.04 gram per each gram of said polymer of at least one material selected from the class consisting of organo sulfonic acid groups and boron trifluoride, and (c) from about 0.0002 to 0.04 gram per each gram of said polymer of at least one material selected from the class consisting of phosphite groups and hypophosphite groups.

3. In a process for making a halogenated phenol-aldehyde polymer by condensing an ortho or para halogenated phenol with an aldehyde under liquid phase conditions, the improvement which comprises conducting the condensation reaction in an inert non-polar organic liquid and in the presence of from about 0.1 to 7 weight percent (based on total halophenol content) of a combination comprising:

(a) from about 10 to 90 weight percent (based on total combination weight) of at least one material selected from the group consisting of $BF_3$ materials and organo sulfonic acid materials, and (b) correspondingly, from about 90 to 10 weight percent (based on total combination weight) of at least one inorganic phosphorous radical-containing compound.

4. The process of claim 3 wherein said organic liquid is one which forms an azeotropic mixture with water.

5. The process of claim 3 wherein said azeotropic liquid is substantially immiscible with water.

6. The process of claim 3 wherein said aldehyde is formaldehyde.

7. The process of claim 3 wherein said phenol compound is para chlorophenol.

8. The process of claim 3 wherein said phenol compound is ortho cholorophenol.

9. The process of claim 3 wherein said halogenated phenol is part of a mixture of phenolic compounds, said mixture of phenolic compounds comprising at least about 50 weight percent of phenolic compounds selected from the group consisting of ortho halophenols and para halophenols and the remainder of said mixture up to 100 weight percent thereof being phenol compounds which are at least as reactive with said aldehyde as are said halophenol compounds.

10. The process of claim 2 wherein said aldehyde is formaldehyde.

11. The process of claim 2 wherein said phenol compound is para chlorophenol.

12. The process of claim 2 wherein said phenol compound is ortho chlorophenol.

References Cited

UNITED STATES PATENTS

| | | | |
|---|---|---|---|
| 1,978,821 | 10/1934 | Schmidt | 260—59 |
| 2,072,901 | 3/1937 | Moss | 260—50 |
| 2,504,100 | 4/1950 | Plank et al. | 260—51 |
| 3,326,843 | 6/1967 | Barnett et. al. | 260—38 |
| 3,367,996 | 2/1968 | Strauss et al. | 260—887 |

WILLIAM H. SHORT, *Primary Examiner.*

H. SCHAIN, *Assistant Examiner.*

U.S. Cl. X.R.

260—29.3, 30.6, 30.8, 32.4, 33.4, 33.6, 33.8, 47, 51